(12) United States Patent
Word

(10) Patent No.: US 10,275,470 B2
(45) Date of Patent: Apr. 30, 2019

(54) NETWORK-BACKED FILE SYSTEM

(71) Applicant: Amazon Technologies, Inc., Reno, NV (US)

(72) Inventor: Jonathan Brian Word, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 685 days.

(21) Appl. No.: 13/968,148

(22) Filed: Aug. 15, 2013

(65) Prior Publication Data

US 2015/0052109 A1    Feb. 19, 2015

(51) Int. Cl.
*G06F 17/30* (2006.01)

(52) U.S. Cl.
CPC .............. *G06F 17/30221* (2013.01)

(58) Field of Classification Search
CPC ........ G06F 17/30221; G06F 17/30091; G06F 17/30212; G06F 17/30303; G06F 17/30899; G06F 17/30979; G06F 17/30132; G06F 17/3007
USPC .................................. 707/828, 829
See application file for complete search history.

(56) References Cited

U.S. PATENT DOCUMENTS

| | | | |
|---|---|---|---|
| 7,441,012 B2 | 10/2008 | Palevich et al. | |
| 7,831,642 B1* | 11/2010 | Kumaresan | G06F 12/0804 707/822 |
| 7,904,435 B2 | 3/2011 | Goyal et al. | |
| 8,296,599 B1 | 10/2012 | Boyer et al. | |
| 8,904,422 B1* | 12/2014 | Chang | H04N 21/4532 725/27 |
| 9,176,871 B1* | 11/2015 | Serlet | G06F 12/0269 |
| 2003/0061504 A1* | 3/2003 | Sprigg | G06F 21/53 726/6 |
| 2004/0201604 A1* | 10/2004 | Kraenzel | G06Q 10/10 715/700 |
| 2006/0059171 A1* | 3/2006 | Borthakur | G06F 17/30067 |
| 2008/0307363 A1* | 12/2008 | Jalon | G06F 17/30126 715/835 |
| 2011/0276538 A1* | 11/2011 | Knapp | G06F 17/302 707/626 |
| 2012/0092346 A1* | 4/2012 | Ording | G06F 3/0481 345/473 |

(Continued)

FOREIGN PATENT DOCUMENTS

WO      2012158654       11/2012

OTHER PUBLICATIONS

International Search Report and Written Opinion from PCT/US2014/051318, dated Nov. 20, 2014, Amazon Technologies, Inc., pp. 1-14.

*Primary Examiner* — James Trujillo
*Assistant Examiner* — Fariborz Khoshnoodi
(74) *Attorney, Agent, or Firm* — Robert C. Kowert; Meyertons, Hood, Kivlin, Kowert & Goetzel, P.C.

(57) ABSTRACT

Methods and systems for implementing a network-backed file system are disclosed. Data indicative of a plurality of subscriptions by a plurality of clients to respective subsections of a file system is stored. The subscriptions comprise one or more read subscriptions and one or more write subscriptions. The read subscriptions are fulfilled by sending modified file chunks of subsections to subscribing clients. The write subscriptions are fulfilled by modifying file chunks of subsections based on write requests submitted by subscribing clients.

20 Claims, 9 Drawing Sheets

(56) References Cited

U.S. PATENT DOCUMENTS

2012/0158672 A1* 6/2012 Oltean ............. G06F 17/30091
　　　　　　　　　　　　　　　　　　　707/692
2013/0117337 A1　 5/2013 Dunham
2013/0305039 A1* 11/2013 Gauda ................ G06F 21/6218
　　　　　　　　　　　　　　　　　　　713/153

* cited by examiner

NETWORK-BACKED FILE SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

As the technological capacity for organizations to create, track, and retain information continues to grow, a variety of different technologies for managing and storing information have been developed. Distributed storage systems, for example, provide clients with many different configurations of hardware and software to manage stored information. However, the increasing amounts of data that organizations must store and manage often correspondingly increase both the size and complexity of data storage and management technologies, which in turn escalate the cost of maintaining the information. New technologies seek to reduce both the complexity and storage requirements of maintaining data while simultaneously improving the efficiency of data storage and data management.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for implementing a network-backed file system are described. Different clients may subscribe to different subsections of a file system maintained by a data store. The subscriptions may include read subscriptions and/or write subscriptions. The read subscriptions may be fulfilled by sending contents of relevant subsections from the data store to subscribing clients. The write subscriptions may be fulfilled by the data store modifying contents of relevant subsections based on write requests submitted by subscribing clients. Updates for both read subscriptions and write subscriptions may include modified file chunks and exclude unmodified file chunks. Using these techniques, read and/or write access to different portions of a file system may be provided to various networked clients both efficiently and securely.

Figure 1:
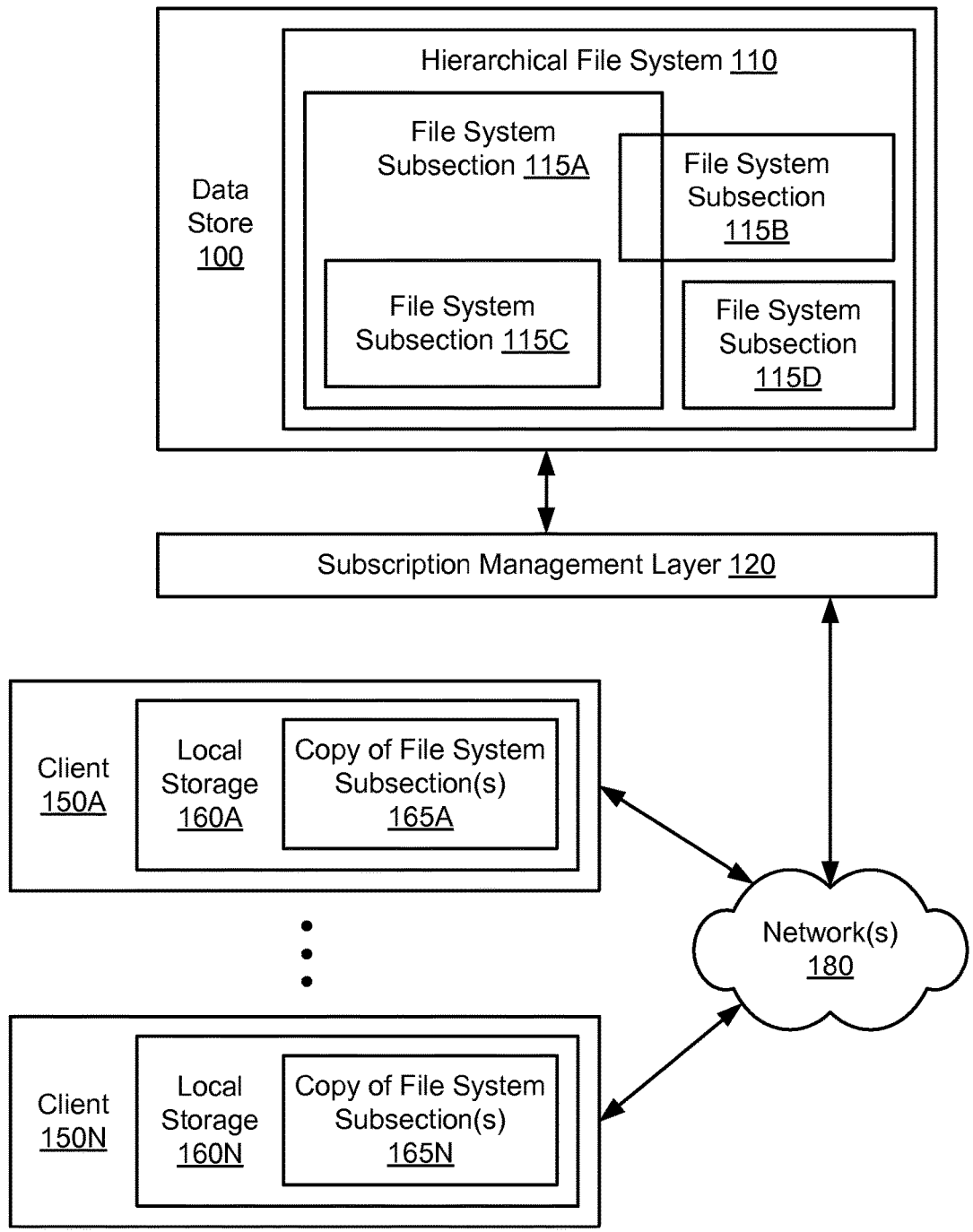
FIG. 1 illustrates an example system environment for a network-backed file system, according to one embodiment.

FIG. 1 illustrates an example system environment for a network-backed file system, according to one embodiment. The example system environment may include a data store 100, a subscription management layer 120, and a plurality of clients 150A-150N that are coupled via one or more networks 180. Although two clients 150A and 150N are shown for purposes of illustration, it is contemplated that different numbers and/or configurations of clients may be used with the network-backed file system. The data store 100 and subscription management layer 120 may provide the functionality of a network-backed file system to the plurality of clients 150A-150N. The data store 100 may store and maintain a hierarchical file system 110. The data store 100 and subscription management layer 120 may together function as a file system subscription management service.

Figure 9:
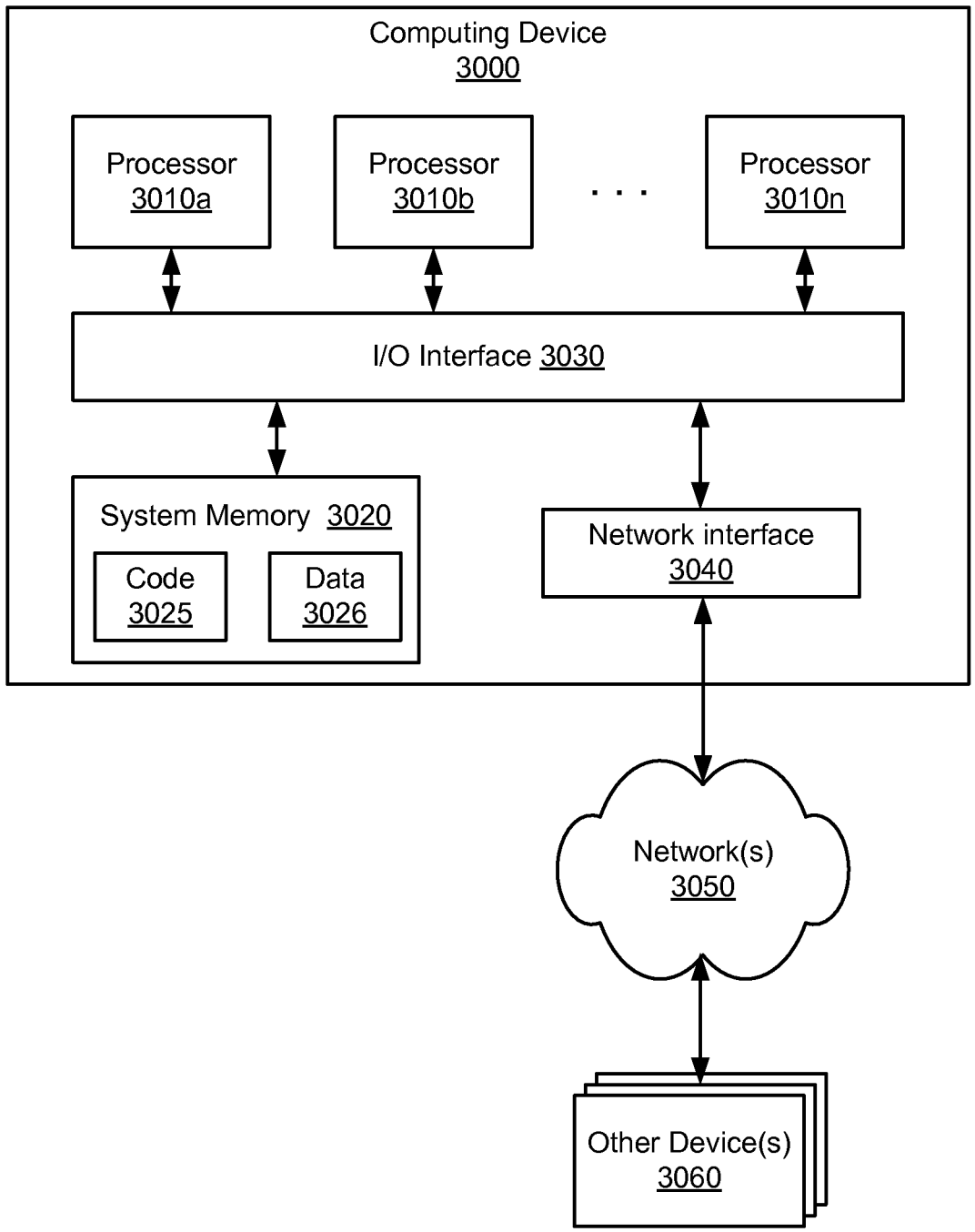
FIG. 9 illustrates an example of a computing device that may be used in some embodiments.

The data store 100 may comprise one or more computing devices, any of which may be implemented by the example computing device 3000 illustrated in FIG. 9. The subscription management layer 120 may also comprise one or more computing devices, any of which may be implemented by the example computing device 3000 illustrated in FIG. 9. Similarly, each of the clients 150A-150N may comprise one or more computing devices, any of which may be implemented by the example computing device 3000 illustrated in FIG. 9. The data store 100 may include or otherwise manage storage resources on which the file system 110 (including file system data and file system metadata) is stored. In various embodiments, the functionality of the different services, components, and/or modules of the data store 100 or subscription management layer 120 may be provided by the same computing device or by different computing devices. If any of the various elements of the data store 100 or subscription management layer 120 are implemented using different computing devices, then the respective computing devices may be communicatively coupled, e.g., via the network(s) 180. The data store 100 and the subscription management layer 120 may each represent any combination of software and hardware usable to perform their respective functions, as discussed as follows.

Any suitable file system technologies and/or storage management technologies may be used to implement the hierarchical file system 110 maintained by the data store 100. In one embodiment, the file system 110 may store a plurality of files that are organized using a hierarchy of directories. The file system 110 may manage the storage, retrieval, and updating of the files and directories. Beginning with a root directory, the hierarchy of directories may include subdirectories (i.e., child directories) within directories (i.e., parent directories). Each directory may include files. In one embodiment, individual files may be divided into file chunks, as will be described in greater detail below. Each file or directory may be accessed by specifying its pathname. A directory in the file system 110 may be identified by a pathname that includes the root directory, the directory names of any intermediate subdirectories (in parent-child order), and the directory name. A file in the file system 110 may be identified by a pathname that includes the root directory, the directory names of any intermediate subdirectories (in parent-child order), and the name of the file. In one embodiment, for files that are divided into file chunks, a chunk may be individually accessible using an index number or other suitable identifier. Additionally, multiple chunks may be accessible via a range of indexes.

The file system may include a plurality of subsections. Each of the subsections may include one or more directories (including one or more child directories), one or more files, and/or one or more portions of a file (e.g., file chunks). Examples of file system subsections 115A, 115B, 115C, and 115D are shown in FIG. 1. However, it is contemplated that different numbers and/or configurations of file system subsections may be included in the file system 110. As shown in the example, a first file system subsection 115A and a second file system subsection 115B may have a partial overlap. Additionally, a third file system subsection 115C may be contained completely within the first file system subsection 115A; for example, the third file system subsection 115C may be one or more subdirectories or one or more files within the first file system subsection 115A. A fourth file system subsection 115D may be completely separate and distinct from the other file system subsections 115A, 115B, and 115C.

Individual ones of the clients 150A-150N may subscribe to one or more subsections of the file system 110. The subscriptions may include read subscriptions to enable making local copies of the contents of one or more subsections of the file system 110 and/or write subscriptions to enable updating the contents of one or more subsections of the file system 110. In various embodiments, a client may subscribe to one or more directories (including one or more child directories), one or more files, and/or one or more portions of a file (e.g., file chunks). In one embodiment, a subscription may include directories, files, and/or chunks that are specifically named in a subscription request. In one embodiment, a subscription may include directories, files, and/or chunks that meet specified criteria. As an example of a named subsection in a subscription, for a network-backed file system (NBFS) named "my-test-data", a client may subscribe (for read and/or write access) to a particular directory that is accessible by a string such as "NBFS://my-test-data/test/dataset1/*", where the asterisk is a wildcard character representing access to all files in the directory as well as any subdirectories and their contents. In one embodiment, a subscription may request access to files matching one or more filters. The filters may be based on any suitable data or metadata, including, but not limited to, file size, the cutting algorithm used to generate file chunks for the file, user-specified tags, creation date (or a range of creation dates), modification date (or a range of modification dates), the user who created the file, the user who last modified the file, the data type of the file, etc. Any suitable file metadata may be used to determine the data type. In one embodiment, the file contents may be inspected to determine the data type.

The subscription management layer 120 may provide an interface between the clients 150A-150N and the data store 100. In one embodiment, the subscription management layer 120 may perform tasks related to storing the subscriptions, maintaining the subscriptions, and otherwise provide management of the subscriptions. The subscription management layer 120 may be implemented using any suitable interface(s) (e.g., an application programming interface) to enable communication regarding subscriptions between the data store 100 and the clients 150A-150N. In one embodiment, the subscription management layer 120 may include an application layer that performs aspects of the subscription management tasks described herein as well as a web services layer that enables the file system subscription management service to operate as a web-based service.

Each subscribing client may submit a subscription request to the subscription management layer 120. A subscription request may include the identity of the subscribing client, the identity of the particular file system 110 if more than one file system is maintained by the data store 100, the type of read and/or write access sought by the client, an identification of the file system subsection(s) to which access is sought, and any other suitable information. In one embodiment, a subscription request may include authorization credentials for the client. In one embodiment, a subscription request may include a requested window of time for which access is sought. In one embodiment, a subscription request may include payment information or other information usable to compensate the provider of the data store 100 for the requested access. The subscription information maintained by the subscription management layer 120 may be used in fulfilling the subscriptions, e.g., by identifying the subscribing client, the type of access, and the identity of the file system subsection(s) to which a particular client has subscribed. The read subscriptions may be fulfilled by sending contents of relevant subsections to subscribing clients. The write subscriptions may be fulfilled by modifying contents of relevant subsections based on write requests submitted by subscribing clients.

In various embodiments, cancellation or revocation of a subscription may be initiated by the subscription management layer 120 and/or the subscribing client. For example, a subscription may be cancelled by the subscription management layer 120 if a staleness threshold for communication with a client is met or exceeded. The staleness threshold may function as a timeout if the subscription management layer 120 cannot verify that a client is responsive to communications. The threshold may vary by the type of subscription, such that a write-only-locked subscription may time out (and thus be revoked) before a read-live subscription.

Each of the subscribing clients 150A-150N may include and/or manage local storage resources. For example, the client 150A may include local storage resources 160A, and the client 150N may include local storage resources 160N. As discussed below with respect to FIG. 9, it is contemplated that various types of storage technologies may be used to implement the local storage resources 160A-160N. The local storage resources 160A-160N may be used to store the contents of one or more file system subsections copied from the file system 110 maintained by the data store 100. As shown in the example of FIG. 1, the local storage 160A of the client 150A may include a copy 165A of one or more of the file system subsection(s) maintained by the data store 100. Similarly, the local storage 160N of the client 150N may include a copy 165N of one or more of the file system subsection(s) maintained by the data store 100. If the client 150A and the client 150N subscribe to different ones of the file system subsections 115A, 115B, 115C, and 115D, then the contents of the local storage 160A may differ from the contents of the local storage 160N. For example, if the client 150A has a read subscription to the file system subsection 115B while the client 150N has a read subscription to the file system subsection 115D, then the local storage 160A may store a copy of the file system subsection 115B while the local storage 160N may store a copy of the file system subsection 115D.

In one embodiment, clients 150A-150N may handle transparent encryption so that the file system subsection data is transferred from the data store 100 and/or subscription management layer 120 in an encrypted manner and then automatically decrypted at the client. The decryption key may be provided to the client using a secure channel. In one embodiment, individual directories, files, and/or chunks within the same file system subsection, including different chunks within the same file, may be encrypted with different keys. In one embodiment, different chunks within the same file may be encrypted using the same key but with different key rotations.

The data store 100 may be responsible for maintaining the coherency, integrity, and security of the file system 100. The data store 100 may also be responsible for maintaining one or more backups of the file system 100. If all of the clients 150A-150N suffered failures at the same time, it is expected that the data store 100 would continue to maintain the file system 110 properly.

Figure 2:
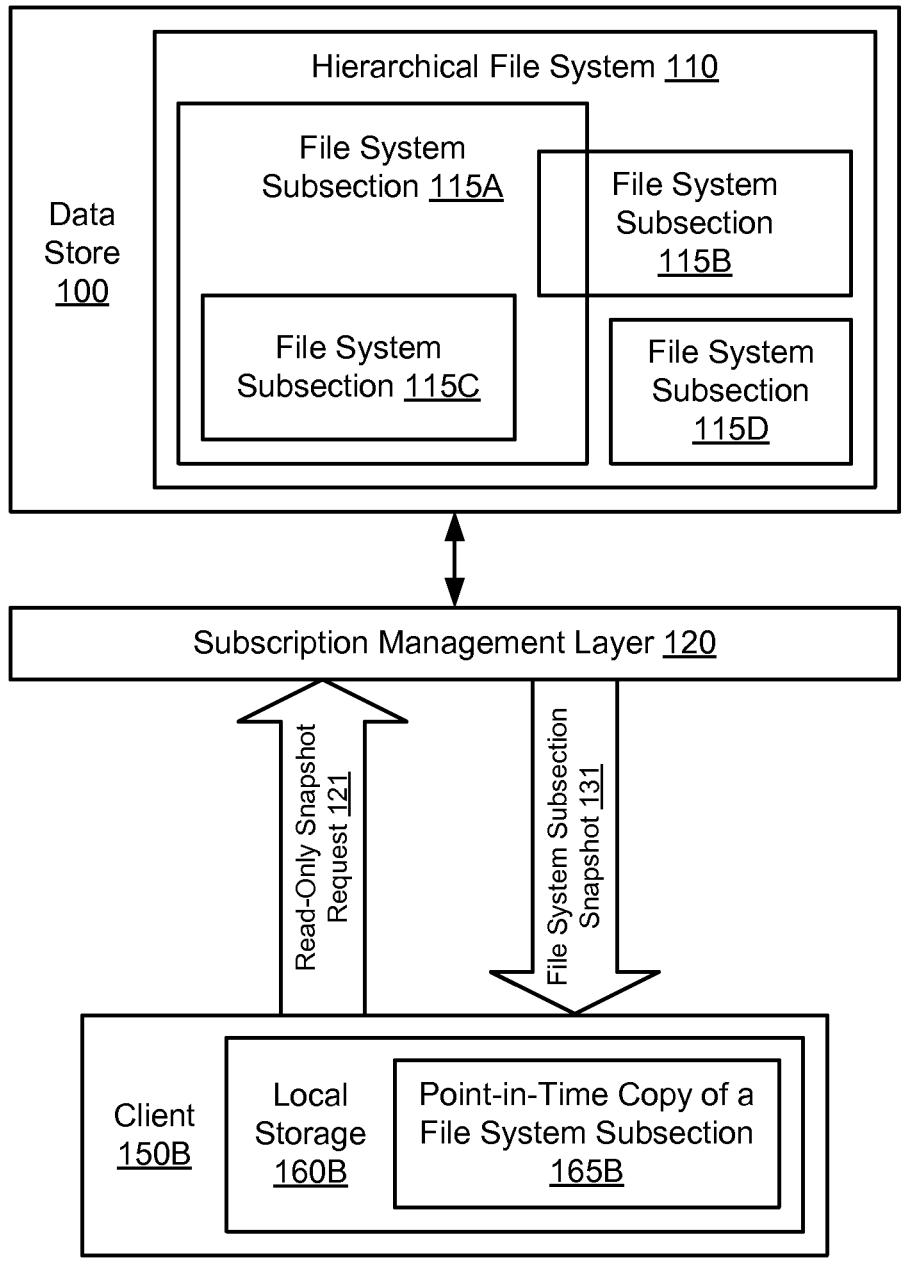
FIG. 2 illustrates an example system environment for a network-backed file system configured to fulfill a read-only snapshot request, according to one embodiment.

In one embodiment, the network-backed file system provided by the data store 100 and subscription management layer 120 may permit a client to obtain a read-only snapshot for one or more subsections of the file system 110. FIG. 2 illustrates an example system environment for a network-backed file system configured to fulfill a read-only snapshot request, according to one embodiment. A client 150B may submit a read-only snapshot request 121 to the file system subscription management service. In one embodiment, the snapshot request may be received and processed by the subscription management layer 120, and any subscription data resulting from the processing of the subscription request may be maintained by the subscription management layer 120. The read-only snapshot request 121 may seek to obtain a point-in-time copy of a file system subsection such as subsection 115A, 115B, 115C, or 115D. Accordingly, to fulfill the request, the data store 100 may use any suitable techniques to generate a point-in-time copy (i.e., a snapshot) 131 of the requested file system subsection and send the snapshot 131 to the requesting client 150B. The client 150B may receive the snapshot 131 from the data store 100 and store it as a local point-in-time copy 165B using local storage resources 160B. In one embodiment, the snapshot 131 may be received by the client 150B using the subscription management layer 120.

In one embodiment, because the snapshot request seeks only a single, point-in-time copy, updates to the relevant file system subsection on the data store 100 are not automatically provided to the subscribing client 150B. However, the client 150B may submit another read-only snapshot request to obtain a copy of the latest version of the relevant file system subsection. In one embodiment, the client 150B alternatively may submit a request to obtain any updates made to the relevant file system subsection since the point-in-time copy was made. In one embodiment, for files divided into file chunks, only updated file chunks may be sent as part of an update. The updates may be sent from the data store 100 to the client 150B using any suitable technique, e.g., a technique to express the updates as a delta of the current state of the relevant file system subsection and the earlier state of the subsection. The subscription management layer 120 may determine the difference(s) between the state of the file system subsection at a first time and the state of the same subsection at a later time (e.g., the time at which the update request is received). Any suitable technique may be used to determine the difference between the versions of the subsection at the two different points in time.

In one embodiment, the network-backed file system provided by the data store 100 and subscription management layer 120 may permit a client to obtain a read-only-delta snapshot for one or more subsections of the file system 110. As shown in FIG. 2, a client 150B may submit a read-only snapshot request 121 to the file system subscription management service. In some cases, the read-only snapshot request 121 may comprise a request for a read-only-delta snapshot that expresses the difference in one or more file system subsections between two points in time. Accordingly, the request for the read-only-delta snapshot may specify the two points in time to be used in generating the comparison. The read-only-delta snapshot may include only those file chunks that have been modified from the beginning point in time to the ending point in time. To enable read-only-delta snapshots to be provided in this manner, the data store 100 may be configured to maintain change information for a relevant subsection of the file system 110 for a period of time. The period of time and the selection of file system subsections to be supported by the read-only-delta functionality may be configurable and may change over time according to the needs of clients. In one embodiment, a request for a read-only-delta snapshot may be accepted and fulfilled only if the points in time specified in the request are consistent with the range of time reflected in the change information stored for a particular file system subsection by the data store 100. For example, if a particular file system subsection has been configured to maintain change information for a period of five days, then a request for a read-only-delta snapshot between two points over the last five days may be fulfilled.

Figure 3:
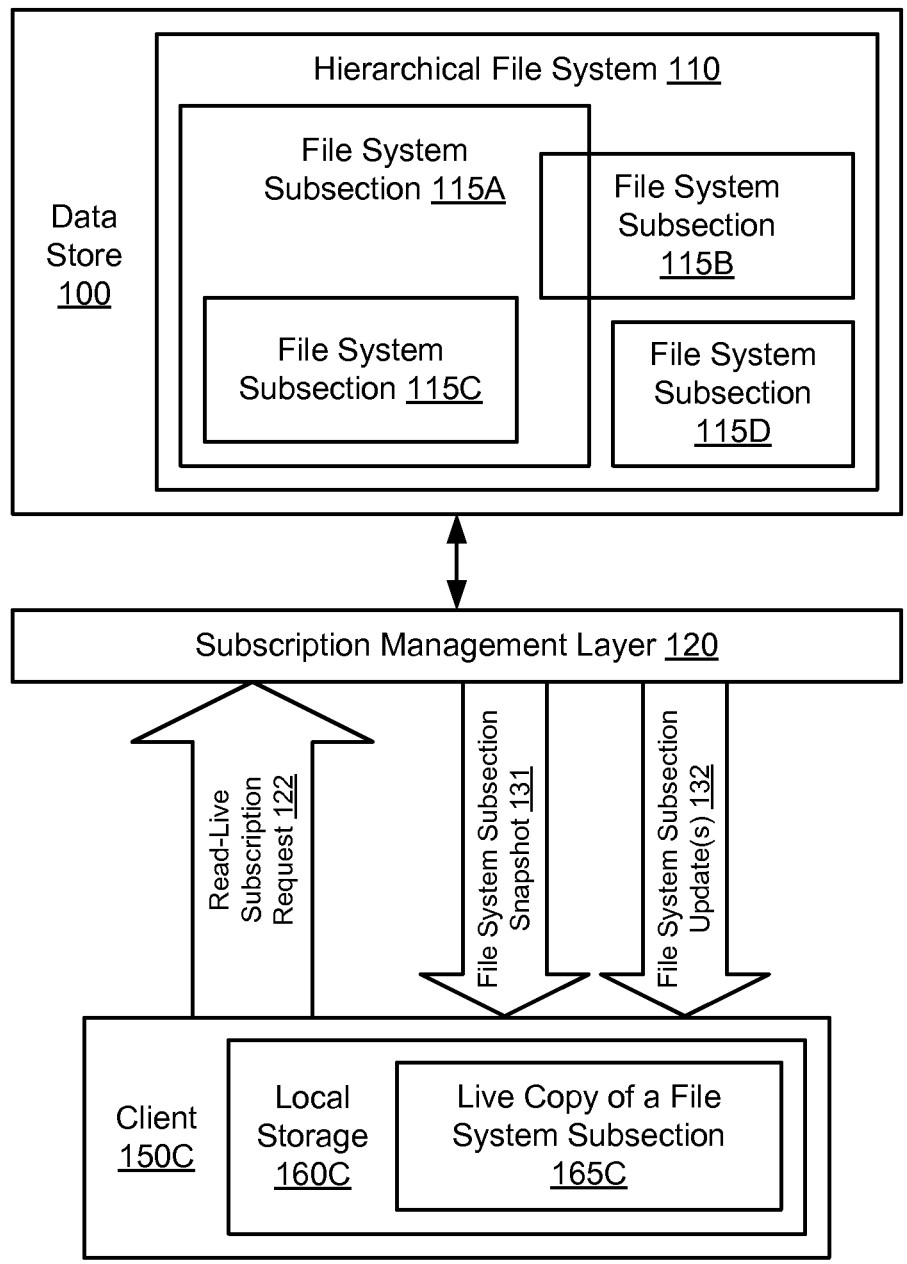
FIG. 3 illustrates an example system environment for a network-backed file system configured to fulfill a read-live subscription, according to one embodiment.

In one embodiment, the network-backed file system provided by the data store 100 and subscription management layer 120 may permit a client to have a read-live subscription to one or more subsections of the file system 110. FIG. 3 illustrates an example system environment for a network-backed file system configured to fulfill a read-live subscription, according to one embodiment. A client 150C may submit a read-live subscription request 122 to the file system subscription management service. In one embodiment, the subscription request may be received and processed by the subscription management layer 120, and any subscription data resulting from the processing of the subscription request may be maintained by the subscription management layer 120. The read-live subscription request 122 may seek to obtain a copy of a file system subsection (such as subsection 115A, 115B, 115C, or 115D) that is kept up to date at the client 150C as the subsection is modified on the data store 100. In one embodiment, to fulfill the request, the data store 100 may use any suitable techniques to generate a point-in-time copy (i.e., a snapshot) 131 of the requested file system subsection and send the snapshot 131 to the requesting client 150C. The client 150C may receive the snapshot 131 from the data store 100 and store it as the initial version of a local copy 165C using local storage resources 160C. In one embodiment, the snapshot 131 may be received by the client 150B using the subscription management layer 120.

In one embodiment, for a read-live subscription request, updates 132 to the relevant file system subsection on the data store 100 may be automatically provided to the subscribing client 150C, i.e., without the client 150C submitting additional requests for the updates. In one embodiment, for a read-live subscription request, the client 150C may be notified when updates 132 are available, and the client 150C may then request the updates 132 as appropriate. The client 150C may apply the updates 132 to the live copy 165C stored locally to keep the copy current. Accordingly, when changes are made on the data store 100 to the file system subsection to which the client 150C has subscribed, the file system subsection updates 132 may be pushed to the client 150C using any suitable technique and with any suitable timing. For example, if multiple clients have a read-live subscription to a particular file system subsection, then updates may be sent to the subscribing clients as a batch at a single time. In one embodiment, for files divided into file chunks, only updated file chunks may be sent as part of an update. In one embodiment, the updates 132 may be sent from the data store 100 to the client 150C using any suitable technique, e.g., a technique to express the updates as a delta of the current state of the relevant file system subsection and the previous state of the subsection. The subscription management layer 120 may determine the difference(s) between the state of the file system subsection at a first time and the state of the same subsection at a later time (e.g., the time at which the update request is received). Any suitable technique may be used to determine the difference between the versions of the subsection at the two different points in time. As long as the read-live subscription is maintained by the subscription management layer 120 and the client 150C, different sets of updates 132 may be provided to the client 150C at various points in time to keep the local copy 165C current.

Figure 4:
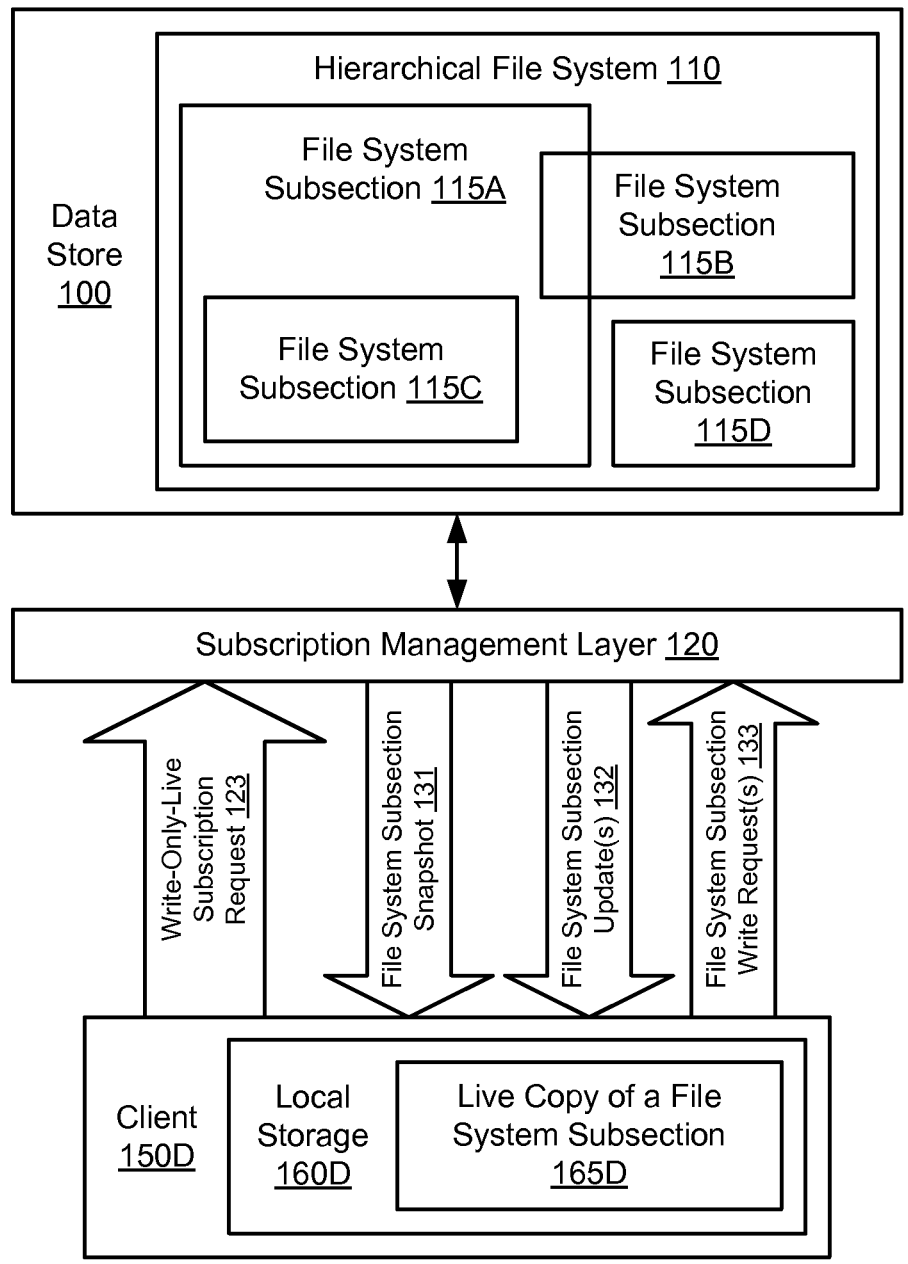
FIG. 4 illustrates an example system environment for a network-backed file system configured to fulfill a write-only-live subscription, according to one embodiment.

In one embodiment, the network-backed file system provided by the data store 100 and subscription management layer 120 may permit a client to have a write-only-live subscription to one or more subsections of the file system 110. FIG. 4 illustrates an example system environment for a network-backed file system configured to fulfill a write-only-live subscription, according to one embodiment. A client 150D may submit a write-only-live subscription request 123 to the file system subscription management service. In one embodiment, the subscription request may be received and processed by the subscription management layer 120, and any subscription data resulting from the processing of the subscription request may be maintained by the subscription management layer 120. The write-only-live subscription request 123, if approved, may permit the client 150D to submit requests to update the contents of a file system subsection (such as subsection 115A, 115B, 115C, or 115D) on the data store 100.

In one embodiment, fulfillment of the write-only-live subscription request 123 may include providing the client 150D with a live copy of the file system subsection to which the client 150D has subscribed for write-only-live access. Accordingly, as discussed above with respect to FIG. 3, the data store 100 may initially provide a snapshot 131 of the file system subsection, and the data store 100 may provide any updates 132 to the file system subsection as they are entered on the data store 100. The updates may be provided as the updated file chunks for the file system subsection that is specified in the subscription. The live copy 165D of the file system subsection may be maintained by the client 150D using local storage resources 160D. However, it is contemplated the fulfillment of the write-only-live subscription request 123 may not include providing the client 150D with a copy of a file system subsection, in one embodiment.

For a write-only-live subscription request, the subscribing client 150D may submit to the data store 100 one or more write requests 133 for a file system subsection. The write request(s) 133 may be submitted using the subscription management layer 120. Updates may be buffered at the client and flushed (as write requests) to the data store 100 using any suitable flushing strategy. If a write request is entered at the data store 100, then the contents of the relevant file system subsection are modified in the file system 110 maintained on the data store 100. A write request may include the contents that are sought to be modified in the relevant file system subsection: one or more modified directories, one or more new directories, one or more deletions of directories, one or more modified files, one or more new files, one or more deletions of files, one or more modified file chunks, one or more new file chunks, and/or one or more deletions of file chunks. In one embodiment, a write request may specify only the file chunks to be modified rather than also including unmodified chunks. In one embodiment, subscribers to the updated file system subsection may be notified of the changes or automatically provided with the changes.

In one embodiment, for a write-only-live subscription request, exclusive access of the client 150D to the file system subsection is not guaranteed. Accordingly, multiple clients may have write-only-live subscriptions to the same file system subsection. If write requests from different clients for the same file system subsection are received within a window of time, then to avoid corrupting the file system subsection, the data store 100 may use any suitable technique to determine which of the write requests, if any, to enter. The other write request(s) for the same file system subsection may be denied. A client whose write request has been denied may be informed of the denial and may resubmit the write request, e.g., after its local copy has been updated. In one embodiment, a write request may be denied if the request is out of date as a result of intervening changes to the relevant file system subsection. For example, a write request may be denied if it seeks to modify a directory, file, or file chunk that has already been deleted.

Figure 5:
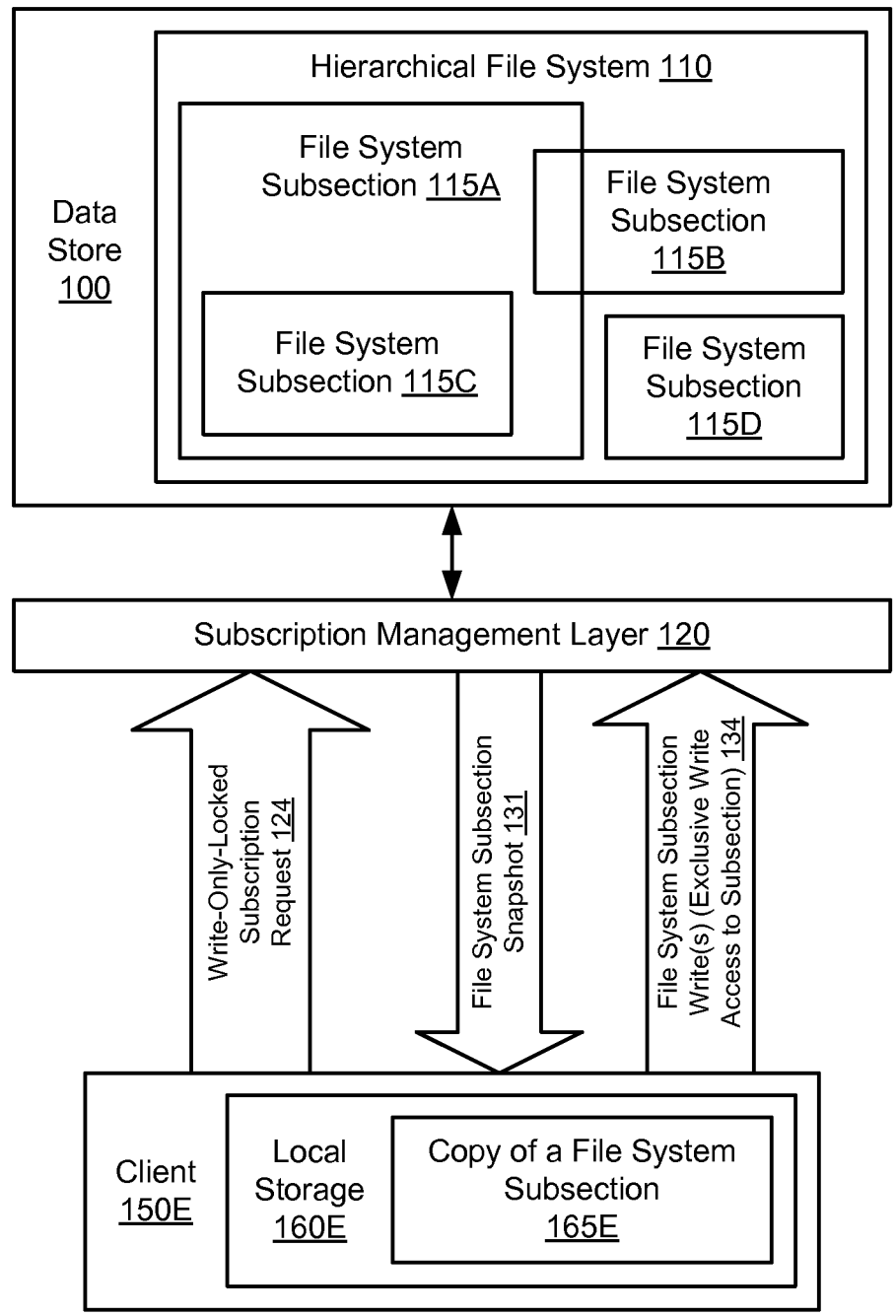
FIG. 5 illustrates an example system environment for a network-backed file system configured to fulfill a write-only-locked subscription, according to one embodiment.

In one embodiment, the network-backed file system provided by the data store 100 and subscription management layer 120 may permit a client to have a write-only-locked subscription to one or more subsections of the file system 110. FIG. 5 illustrates an example system environment for a network-backed file system configured to fulfill a write-only-locked subscription, according to one embodiment. A client 150E may submit a write-only-locked subscription request 124 to the file system subscription management service. In one embodiment, the subscription request may be received and processed by the subscription management layer 120, and any subscription data resulting from the processing of the subscription request may be maintained by the subscription management layer 120. The write-only-locked subscription request 124, if approved, may permit the client 150E to submit requests to update the contents of a file system subsection (such as subsection 115A, 115B, 115C, or 115D) on the data store 100. In one embodiment, a write-only-locked subscription may guarantee exclusive write access to a file system subsection on behalf of the subscribing client.

In one embodiment, fulfillment of the write-only-locked subscription request 124 may include providing the client 150E with an initial copy of the file system subsection to which the client 150E has subscribed for write-only-locked access. Accordingly, as discussed above with respect to FIG. 2, the data store 100 may initially provide a snapshot 131 of the file system subsection. The copy 165E of the file system subsection based on the snapshot 131 may be maintained by the client 150E using local storage resources 160E. Because exclusive write access for the subscribing client 150E may be guaranteed, updates may not be provided from the data store 100 after the snapshot is generated. However, it is contemplated the fulfillment of the write-only-locked subscription request 124 may not include providing the client 150E with a copy of a file system subsection, in one embodiment.

For a write-only-locked subscription request, the subscribing client 150E may submit to the data store 100 one or more write requests 134 for a file system subsection. The write request(s) 133 may be submitted using the subscription management layer 120. Updates may be buffered at the client and flushed (as write requests) to the data store 100 using any suitable flushing strategy. If a write request is entered, the contents of the relevant file system subsection are modified in the file system 110 maintained on the data store 100. A write request may include the contents that are sought to be modified in the relevant file system subsection: one or more modified directories, one or more new directories, one or more deletions of directories, one or more modified files, one or more new files, one or more deletions of files, one or more modified file chunks, one or more new file chunks, and/or one or more deletions of file chunks. If the client 150E maintains a local copy 165E, the client 150E may also enter the changes against the local copy 165E. In one embodiment, clients other than the subscribing client 150E may be prevented from submitting write requests to the relevant file system subsection as long as the write-only-locked subscription for the client 150E is maintained. In one embodiment, a write request may specify only the file chunks to be modified rather than also including unmodified chunks. In one embodiment, subscribers to the updated file system subsection may be notified of the changes or automatically provided with the changes.

In one embodiment, the network-backed file system may provide write-only-locked access to a particular file system subsection for only one client at a time. For example, if one client has a write-only-locked subscription to the file system subsection 115D, then the subscription management layer 120 may deny write subscriptions (e.g., write-only-locked subscriptions and write-only-live subscriptions) to the same subsection 115D from other clients. As another example, if one client has a write-only-locked subscription to the file system subsection 115C, then the subscription management layer 120 may deny write subscriptions (e.g., write-only-locked subscriptions and write-only-live subscriptions) to the same subsection 115C from other clients, including clients seeking write access to the overlapping or parent file system subsection 115A.

In one embodiment, files may be divided into file chunks automatically for storage in the network-backed file system. The greater granularity provided by the use of file chunks may permit more efficient communication between the network-backed file system and the subscribers to the file system. For example, updates to file system subsections may be provided to clients by sending only those chunks that have been modified rather than entire files. In one embodiment, a file may be divided into chunks of equal size, such as by generating a new chunk after every 4096 bytes. In one embodiment, a file may be divided into chunks that vary in size. By attempting to follow boundaries of records when cutting files into file chunks, the integrity of individual records may tend to be maintained such that file chunks may tend to contain whole records rather than partial records.

Figure 6:
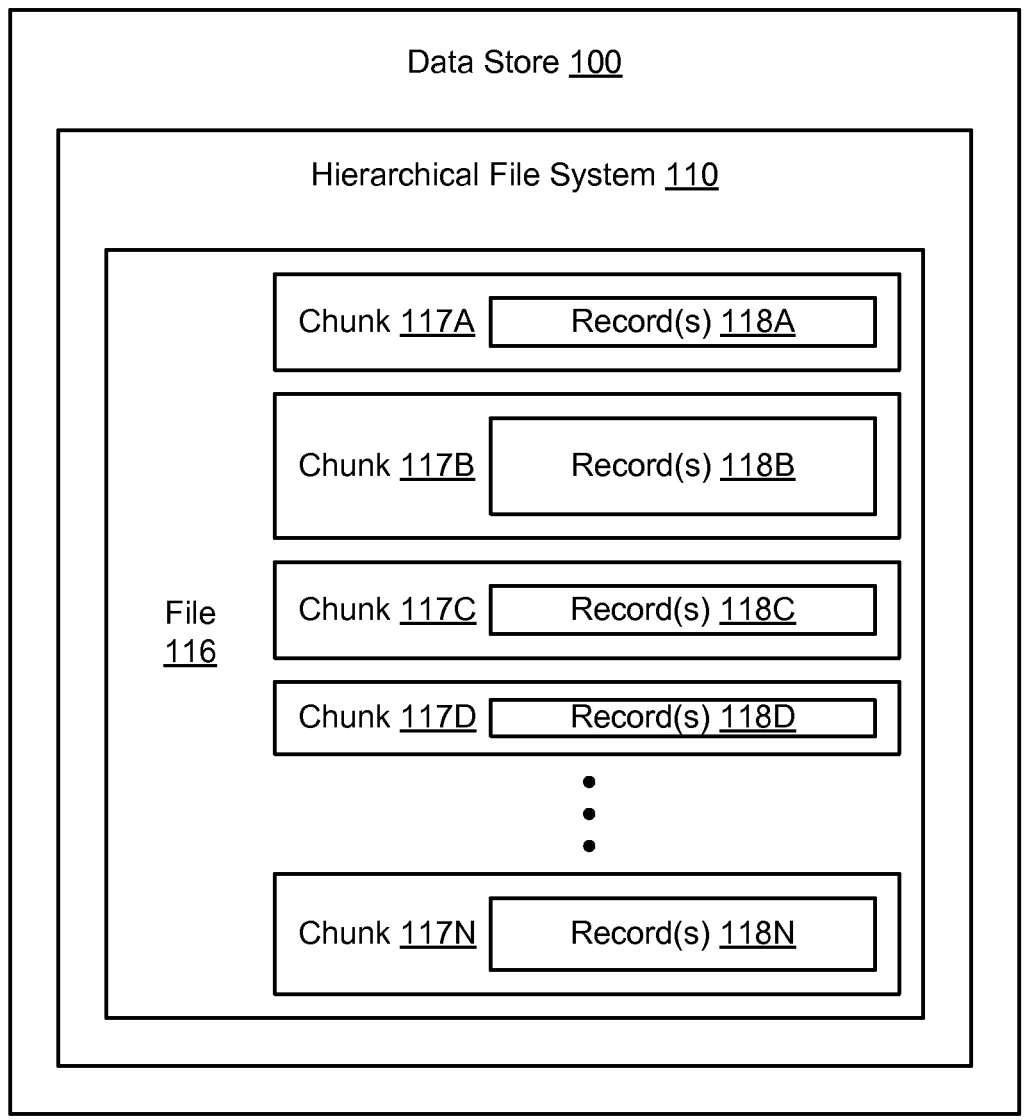
FIG. 6 illustrates an example of a file divided into file chunks of varying size in a network-backed file system, according to one embodiment.

FIG. 6 illustrates an example of a file divided into file chunks of varying size in a network-backed file system, according to one embodiment. As discussed above, the data store 100 may store a hierarchical file system 110 that includes a plurality of files organized using a hierarchy of directories. An example file 116 is shown. When the file 116 is added to the hierarchical file system 110 (e.g., by a client subscribed with write access), the file 116 may be divided into multiple file chunks. As shown in the example, the file 116 may be divided into chunks 117A, 117B, 117C, and 117D through 117N. However, it is contemplated that different numbers of chunks may be generated when dividing a file into chunks. In one embodiment, the file may be divided automatically by any suitable component of the file system subscription management service, including a component of the data store 100, the subscription management layer 120, or another component.

In various embodiments, the chunk-cutting techniques used to divide files into chunks may vary. In one embodiment, a chunk-cutting technique may be selected by the file system subscription management service automatically, e.g., based on a data type or content of the file. For example, the file system subscription management service may maintain chunk-cutting techniques for common data types. The data type of a file to be divided into chunks may be determined using any suitable file metadata and/or by inspection of the contents of the file; a matching chunk-cutting technique may then be selected based on the determined data type of the file. In one embodiment, a chunk-cutting technique may be selected and then presented to the client for confirmation or veto. In one embodiment, a custom chunk-cutting technique may be submitted by a client in association with an account (potentially including multiple client computer systems), with a particular subscription made under the account, or with a particular write request for a particular file.

In one embodiment, a chunk-cutting technique may generate individual chunks that contain whole records rather than partial records. As used herein, the term "record" may include a line of text in a line-of-text-based file (e.g., a .txt log file or a .csv file containing lines of text with comma-separated values), a complex or structured record in a list-of-records-based file (e.g., a .xml file or a .json file), a frame of video, or any other suitable unit of data. The boundaries of such records may be observed when cutting the file 116 into the chunks 117A, 117B, 117C, and 117D through 117N. For example, a new chunk in a line-of-text-based file may be generated on the first new line after a predetermined amount of bytes (e.g., 8 MB or any other suitable size) have been encountered. As another example, a new chunk in list-of-records-based file may be generated on the first new record after a predetermined amount of bytes (e.g., 8 MB or any other suitable size) have been encountered. For a file containing digital video, chunks may be generated to preserve the metadata structure before and after a frame of video. Additionally, a client may submit a unique string representing an end-of-line marker for a less common file type. Accordingly, as shown in the example of FIG. 6, chunk 117A may contain one or more whole records 118A, chunk 117B may contain one or more whole records 118B, chunk 117C may contain one or more whole records 118C, chunk 117D may contain one or more whole records 118D, and chunk 117N may contain one or more whole records 118N. Different ones of the chunks within the file 116 may tend to vary in size if the individual records tend to vary in size. In one embodiment, chunks may be limited to a maximum size, and some chunks at the maximum size may contain partial records, e.g., at the beginning and/or end of the chunk. Accordingly, the chunk-cutting techniques described herein may attempt to preserve whole records within chunks but may not always produce such chunks.

Figure 7:
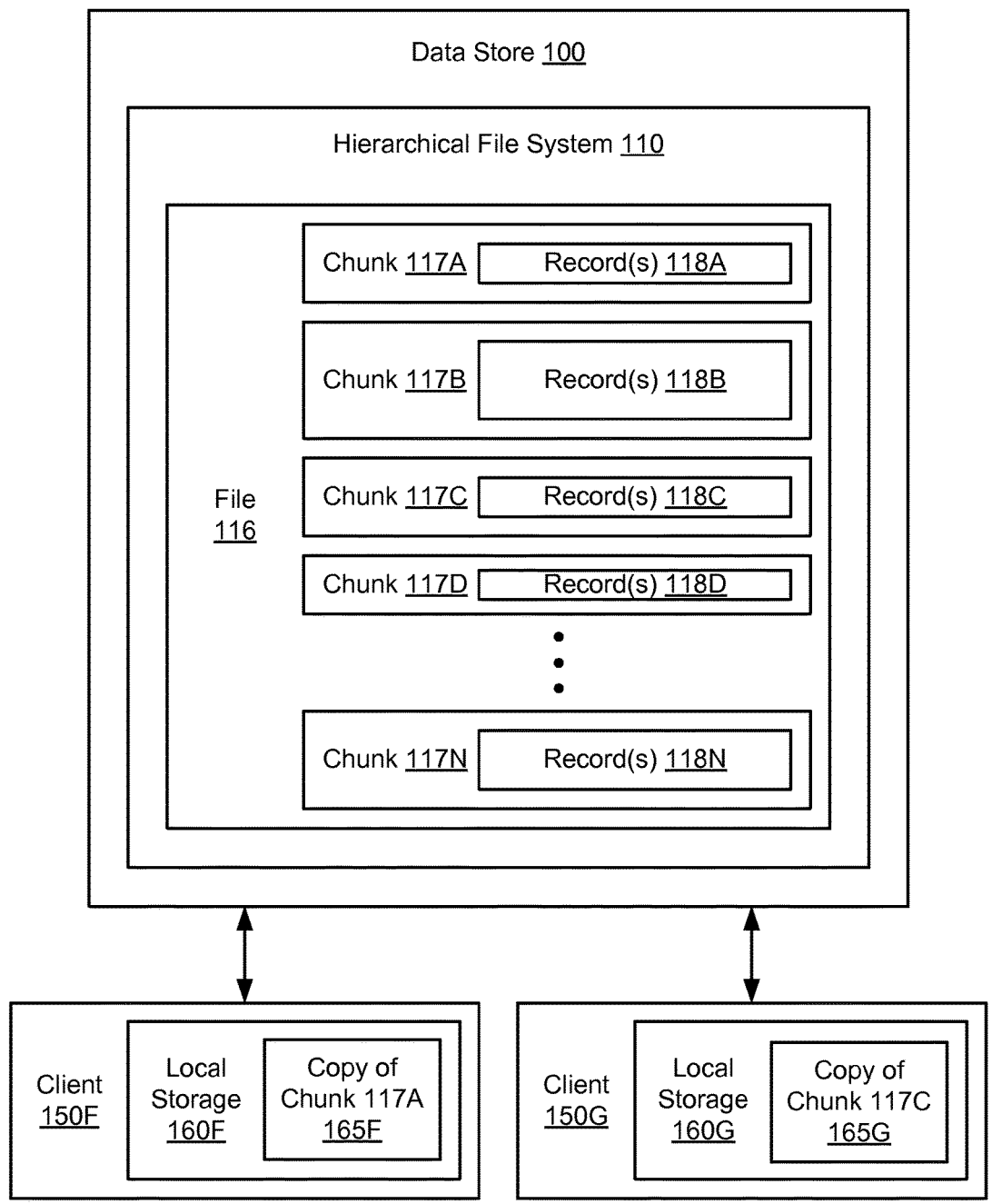
FIG. 7 illustrates an example of different clients subscribing to file chunks from the same file in a network-backed file system, according to one embodiment.

FIG. 7 illustrates an example of different clients subscribing to chunks from the same file in a network-backed file system, according to one embodiment. By dividing a file 116 into multiple chunks that tend to contain whole records rather than partial records, different chunks within the same file 116 may be processed by different clients. As shown in the example of FIG. 7, one client 150F may store a local copy 165F of a particular chunk, such as chunk 117A, in the client's local storage 160F. Furthermore, another client 150G may store a local copy 165G of a different chunk, such as chunk 117C, in the client's local storage 160G. The copies of the file chunks may be obtained using a suitable subscription request or other request, including a read-live subscription request or a read-only snapshot request for one or more specific chunks of the file 116. Because the file 116 has been divided into chunks that each contain whole records, the two clients 150F and 150G may perform operations on different portions of the file without needing to obtain copies of multiple file chunks in order to reconstruct partial records on chunk boundaries. Similarly, multiple clients may update multiple chunks within the same file 116 using a write-only-live subscription in which exclusive write access to the file 116 is not guaranteed.

In one embodiment, a chunk may be permitted to grow to a certain predetermined size until the chunk is split into two chunks. The maximum chunk size may be configurable per account, per client, or per file type. Similarly, a chunk may be permitted to shrink to a certain predetermined size until the chunk is merged into another chunk (e.g., a neighboring chunk). The minimum chunk size may be configurable per account, per client, or per file type. As discussed below, the new chunk(s) resulting from a split or a merge may have index identifiers that are based on the index identifier of the old chunk(s).

In one embodiment, each file chunk may be identifiable by an index number. A radix tree or other suitable data structure may be used to maintain an index of the chunks in a file. Using a radix tree, indexes for chunks may vary in length, and the length of an index (in digits or characters) may generally indicate its depth in the tree. When a large chunk is divided into two new chunks, or when a chunk is added between two existing chunks, nodes may be added to a lower level of the radix tree; the newly added nodes may represent indexes that are one or more digits or characters longer than the nodes at the next highest level of the tree. In this manner, indexes of existing chunks may be preserved when new chunks are added. The index of a child node may be longer than the index of its parent node and may include the index of its parent node as a prefix. In one embodiment, a client that subscribes to a parent chunk may be automatically subscribed to newly generated child chunks whose indexes include the index of the parent chunk as a prefix. For example, a read-live subscription may provide read access to a specific file and a specific chunk '1A2' of that file. If the chunk '1A2' is split into two new chunks '1A21' and '1A22,' then the original subscription may automatically provide the same level of read access to the two new chunks based on the relationship between the new index identifiers and the parent index identifier (e.g., as expressed in a radix tree). Similarly, if chunk '1A21' shrinks and is merged into neighboring chunk '1A22' to create a new chunk '1A2,' then a subscriber to '1A21' may automatically be granted access to the new chunk '1A2' based on the index relationship.

Figure 8:
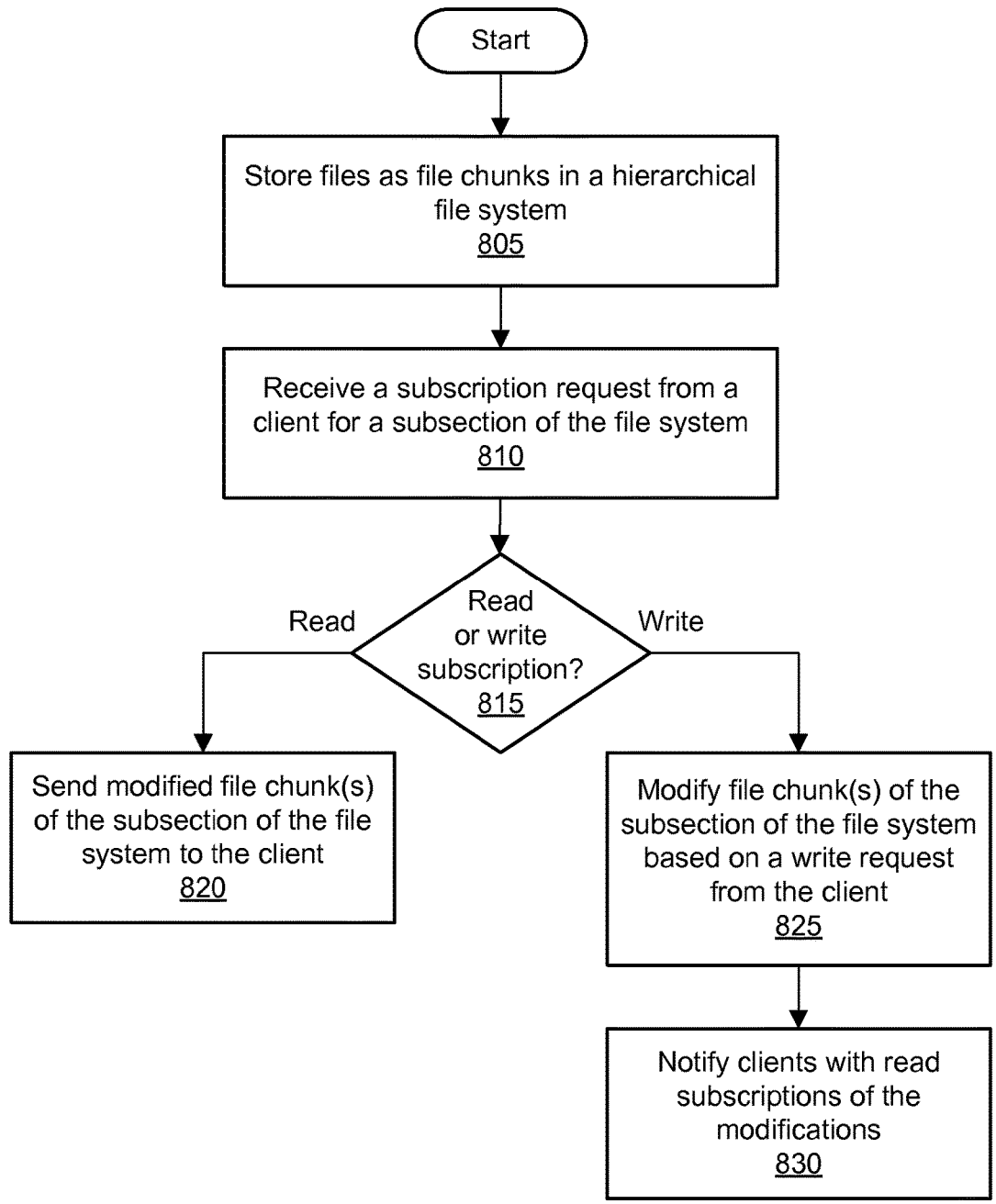
FIG. 8 is a flowchart illustrating a method for managing a network-backed file system, according to one embodiment.

FIG. 8 is a flowchart illustrating a method for managing a network-backed file system, according to one embodiment. As shown in 805, files may be stored in a hierarchical file system. The file system may be maintained as a network-backed file system by a data store that manages storage resources. The data store may be coupled to one or more clients over a network. Each of the files may be stored as one or more file chunks. In one embodiment, files added to the file system may be divided into file chunks automatically (as discussed above with respect to FIGS. 6 and 7).

As shown in 810, a subscription request may be received from a client for a particular subsection of the file system. In various embodiments, the subscription request may be a read subscription request, a write subscription request, or a combination or variation thereof. The subscription request may specifically name or specify criteria for one or more directories (including their contents, including subdirectories and their contents), one or more files, and/or one or more chunks within files. The subscription request may also specify a window of time before the subscription expires.

As shown in 815, to fulfill the subscription, it may be determined what type of access is sought by the subscription, such as read access or write access. As shown in 820, for a read subscription, the subscription may be fulfilled by sending a copy of the contents of the subsection of the file system from the data store to the subscribing client. The client may store the local copy using local storage resources. The read subscription may be fulfilled based on the specific type of read subscription or other request, including as a read-only snapshot (as discussed with respect to FIG. 2) or a read-live subscription (as discussed with respect to FIG. 3) for which live updates may be provided. In one embodiment, the operation shown in 820 may include sending only the modified chunks of a file system subsection as part of an update for a read subscription.

As shown in 825, for a write subscription, the subscription may be fulfilled by the data store modifying contents of the subsection of the file system based on a write request submitted by the subscribing client. The write subscription may be fulfilled based on the specific type of write subscription, such as a write-only-live subscription (as discussed with respect to FIG. 4) or a write-only-locked subscription (as discussed with respect to FIG. 5) that guarantees exclusive write access. In one embodiment, the operation shown in 825 may include the data store receiving a write request that includes only the modified file chunks of a file system subsection. As shown in 830, clients with read subscriptions may be notified of the modifications entered in 825. The clients may request to receive the modifications (e.g., the updated file chunks) or may automatically receive the modifications (as discussed above with respect to FIG. 3).

Network-Based Services

In one embodiment, the network-backed file system may be provided to clients by a network-based service (e.g., a web-based service), e.g., a file system subscription management service. The network-based service may host a plurality of network-backed file systems. In some embodiments, a resource management system may manage dynamic pricing, reservation, and allocation of network-based resources such as a network-backed file system. Networks set up by an entity such as a company or a public sector organization to provide one or more services (such as various types of network-accessible computing or storage) accessible via the Internet and/or other networks to a distributed set of clients may be termed provider networks. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

In some embodiments, operators of provider networks may implement a flexible set of resource reservation, control, and access interfaces for their clients. For example, a resource manager of the provider network may implement a programmatic resource reservation interface (e.g., via a web site or a set of web pages) that allows clients to learn about, select, purchase access to, and/or reserve compute instances and subscribe to network-backed file systems. Such an interface may include capabilities to allow browsing of a resource catalog and provide details and specifications of the different types or sizes of resources supported, the different reservation types or modes supported, pricing models, and so on. The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one-year or three-year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager and may be allocated to some other client that is willing to pay a higher price. Other purchasing modes or combinations of modes may be implemented by the resource manager in some embodiments.

Illustrative Computer System

In at least some embodiments, a computer system that implements a portion or all of one or more of the technologies described herein may include a general-purpose computer system that includes or is configured to access one or more computer-readable media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a file system subscription management service, wherein the file system subscription management service is configured to:
store a plurality of files in a hierarchical file system in a data store, wherein individual ones of the files are divided into respective sets of file chunks of varying size;
receive, from a first client, a read subscription request for a first subsection of a plurality of subsections of the hierarchical file system, wherein the first subsection comprises two or more of the plurality of files, and wherein the read subscription request comprises an identification of the first subsection from among the plurality of different subsections of the hierarchical file system to be subscribed to for receiving updates or notifications of updates to files of the first subsection;
store data at the file system subscription management service indicative of a subscription of the first client to the first subsection of the hierarchical file system, wherein the file system subscription management service stores data indicative of a plurality of subscriptions by a plurality of clients to respective subsections of the hierarchical file system;
send, to the first client, a copy of at least a portion of the contents of the first subsection of the hierarchical file system based on the read subscription request, wherein the copy is sent to the first client in response to modification, subsequent to receiving the read subscription request, of one or more file chunks in the first subsection of the hierarchical file system and without receiving a request from the first client for the copy subsequent to the modification, and wherein the copy comprises the one or more modified file chunks;
receive, from a second client, a write subscription request for a second subsection of the hierarchical file system, wherein the second subsection has no overlap or a partial overlap with the first subsection; and
modify at least a portion of the contents of the second subsection of the hierarchical file system based on a write request from the second client, wherein the write request comprises one or more modified file chunks for the second subsection.

2. The system as recited in claim 1, wherein the write subscription request for the second subsection of the hierarchical file system comprises a write-only-locked subscription request for the second subsection of the hierarchical file system, and wherein the file system subscription management service is configured to:
prevent write access to the second subsection of the hierarchical file system by one or more other clients based on the write-only-locked subscription request.

3. The system as recited in claim 1, wherein the copy sent to the first client excludes one or more unmodified file chunks in the first subsection of the hierarchical file system, and wherein the write request excludes one or more unmodified file chunks in the second subsection of the hierarchical file system.

4. A computer-implemented method, comprising:
receiving, from a first client, a first subscription request for a first subsection of a plurality of subsections of a hierarchical file system, wherein the file system stores a plurality of files, and wherein the first subsection comprises fewer than the plurality of files, and wherein the first subsection comprises two or more of the plurality of files, and wherein the first subscription request comprises an identification of the first subsection from among the plurality of different subsections of the hierarchical file system to be subscribed to for receiving updates or notifications of updates to files of the first subsection;
storing data at a file system subscription management service indicative of a subscription of the first client to the first subsection of the hierarchical file system, wherein the file system subscription management service stores data indicative of a plurality of subscriptions by a plurality of clients to respective subsections of the hierarchical file system;
fulfilling the first subscription request, comprising:
sending, to the first client, a copy of one or more modified file chunks of the first subsection of the hierarchical file system in response to modification, subsequent to receiving the first subscription request, of the one or more file chunks in the first subsection of the hierarchical file system and without receiving a request from the first client for the copy subsequent to the modification, wherein the first subscription request comprises a read subscription request; or
modifying one or more file chunks of the first subsection of the file system based on a write request from the first client, wherein the first subscription request comprises a write subscription request.

5. The method as recited in claim 4, further comprising:
receiving, from a second client, a second subscription request for a second subsection of the file system, wherein the second subsection comprises at least one file that is included in the first subsection and at least another file that is not included m the first subsection; and
fulfilling the second subscription request, comprising:
sending, to the second client, a copy of one or more modified file chunks of the second subsection of the file system based on the second subscription request, wherein the second subscription request comprises a second read subscription request; or
modifying one or more file chunks of the second subsection of the file system based on a write request from the second client, wherein the second subscription request comprises a second write subscription request.

6. The method as recited in claim 4, wherein the copy sent to the first client excludes one or more unmodified file chunks in the first subsection of the file system, and wherein the write request excludes one or more unmodified file chunks.

7. The method as recited in claim 4, wherein the read subscription request for the first subsection of the file system comprises a read-only snapshot request for the first subsection of the file system, and wherein the method further comprises:

receiving, from the first client, a request to refresh a snapshot of the first subsection stored locally by the first client;
determining one or more additional modified file chunks of the first subsection based on a comparison between the snapshot of the first subsection and a current state of the first subsection; and
sending, to the first client, a copy of the additional modified file chunks.

8. The method as recited in claim 4, wherein the write subscription request for the first subsection of the file system comprises a write-only-locked subscription request for the first subsection of the file system, and wherein fulfilling the first subscription request further comprises:
preventing write access to the first subsection of the file system by one or more other clients based on the write-only-locked subscription request.

9. The method as recited in claim 4, further comprising:
dividing individual ones of the files into respective sets of file chunks of varying size that preserve complete individual records within the individual ones of the files.

10. The method as recited in claim 4, further comprising:
receiving a user selection of a chunk-cutting algorithm; and
dividing individual ones of the files into respective sets of file chunks based on the selected chunk-cutting algorithm.

11. The method as recited in claim 4, further comprising:
receiving, from a user, a chunk-cutting algorithm; and
dividing individual ones of the files into respective sets of file chunks based on the received chunk-cutting algorithm.

12. A system, comprising:
at least one processor;
a data store configured to store a plurality of files in a hierarchical file system, wherein individual ones of the files are divided into respective sets of file chunks; and
a memory coupled to the at least one processor, wherein the memory stores program instructions, wherein the program instructions are executable by the at least one processor to:
store data indicative of a plurality of subscriptions by a plurality of clients to respective subsections of the file system that comprise respective files of the plurality of files, and wherein each of the plurality of subscriptions comprises an identification of a respective subsection from among the plurality of different subsections of the hierarchical file system to be subscribed to for receiving updates or notifications of updates to files of the subsection, and wherein the plurality of subscriptions comprise one or more read subscriptions and one or more write subscriptions;
fulfill individual ones of the read subscriptions, wherein the program instructions are executable by the at least one processor to send modified file chunks for individual ones of the subsections of the hierarchical file system to individual ones of the plurality of clients in response to modification, subsequent to receiving a request for the read subscription, of the file chunks in the individual ones of the subsections of the hierarchical file system and without receiving a request from the first client for the modified file chunks subsequent to the modification; and
fulfill individual ones of the write subscriptions, wherein the program instructions are executable by the at least one processor to modify individual file chunks of individual ones of the subsections based on write requests submitted by individual ones of the plurality of clients.

13. The system as recited in claim 12, wherein, in fulfilling the individual ones of the write subscriptions, the program instructions are executable by the at least one processor to:
provide exclusive write access to individual ones of the subsections for individual ones of the clients.

14. The system as recited in claim 12, wherein the program instructions are executable by the at least one processor to:
divide individual ones of the files into respective sets of file chunks of varying size, wherein boundaries of at least a portion of the file chunks follow boundaries of individual records.

15. The system as recited in claim 12, wherein, in fulfilling the individual ones of the read subscriptions, the program instructions are executable by the at least one processor to send the modified file chunks and not send one or more unmodified chunks for the individual ones of the subsections to the individual ones of the plurality of clients.

16. The system as recited in claim 12, wherein individual ones of the write requests comprise one or more modified file chunks and exclude one or more unmodified chunks.

17. The system as recited in claim 12, wherein the program instructions are further executable by the at least one processor to:
receive requests for the plurality of subscriptions from the plurality of clients through a web-based application programming interface.

18. A non-transitory computer-readable storage medium storing program instructions computer-executable to perform:
sending, to a file system subscription management service, a subscription request for a subsection of a plurality of subsections of a hierarchical file system, wherein the subsection comprises two or more files of a plurality of files of the file system, and wherein the subscription request comprises an identification of the subsection from among the plurality of different subsections of the hierarchical file system to be subscribed to for receiving updates or notifications of updates to files of the subsection, and wherein the subscription request comprises a read subscription request or a write subscription request;
storing data at the file system subscription management service indicative of a subscription by a client to the subsection of the hierarchical file system, wherein the file system subscription management service stores data indicative of a plurality of subscriptions by a plurality of clients to respective subsections of the hierarchical file system;
receiving, from the file system subscription management service, one or more modified file chunks of the subsection of the hierarchical file system in response to modification, subsequent to receiving the subscription request, of the one or more file chunks in the subsection of the hierarchical file system and without receiving a request for the one or more modified file chunks subsequent to the modification if the subscription request comprises the read subscription request; and
sending, to the file system subscription management service, a write request comprising one or more modified file chunks of the subsection of the file system if the subscription request comprises the write subscription request.

19. The non-transitory computer-readable storage medium as recited in claim 18, wherein the write request excludes one or more unmodified file chunks of the subsection of the file system.

20. The non-transitory computer-readable storage medium as recited in claim 18, wherein sending the subscription request comprises invoking one or more functions of a web-based application programming interface.

* * * * *